United States Patent [19]

Haldipur et al.

[11] 4,391,611

[45] Jul. 5, 1983

[54] GASIFICATION SYSTEM

[75] Inventors: Gaurang B. Haldipur, Hempfield; Richard G. Anderson, Penn Hills; Peter Cherish, Bethel Park, all of Pa.

[73] Assignee: The United States of America as represented by the United States Department of Energy, Washington, D.C.

[21] Appl. No.: 240,654

[22] Filed: Mar. 5, 1981

[51] Int. Cl.³ .............................................. C10J 3/68
[52] U.S. Cl. .................................. 48/197 R; 48/203; 48/206; 48/DIG. 4; 422/145
[58] Field of Search ...................... 48/197 R, 206, 203, 48/DIG. 4; 422/145; 34/57 A

[56] References Cited

U.S. PATENT DOCUMENTS

| 2,886,421 | 5/1959 | Dickinson | 48/206 |
|---|---|---|---|
| 2,898,204 | 8/1959 | Totzek | 48/203 |
| 3,110,578 | 11/1963 | Severson et al. | 48/203 |
| 3,743,606 | 7/1973 | Marion et al. | 252/373 |
| 3,804,606 | 4/1974 | Archer et al. | 48/206 |
| 3,847,563 | 11/1974 | Archer et al. | 48/77 |
| 3,861,862 | 1/1975 | Steever | 432/58 |
| 3,993,445 | 1/1976 | Mueller et al. | 48/197 R |
| 4,021,193 | 5/1977 | Waters | 432/58 |
| 4,152,843 | 5/1979 | Kemmetmueller | 34/229 |
| 4,173,189 | 11/1979 | Cooper | 110/106 |
| 4,282,010 | 8/1981 | Cherish et al. | 48/77 |

FOREIGN PATENT DOCUMENTS

| 963456 | 2/1975 | Canada . |
|---|---|---|
| 1262818 | 4/1961 | France . |
| 2296004 | 7/1976 | France . |
| 2333852 | 1/1977 | France . |

OTHER PUBLICATIONS

"Advanced Coal Gasification System for Electric Power Generation" by Westinghouse Elec. Corp., 1971.
Archer et al., "The Westinghouse Fluidized Bed Process", Westinghouse Elec. Corp., 1978.
Salvador et al., "Process Development for the Westinghouse Advanced Fluidized-Bed Coal Gasification System", Westinghouse Elec. Corp., 1977.

Primary Examiner—William F. Smith
Attorney, Agent, or Firm—William E. Otto

[57] ABSTRACT

A method and system for injecting coal and process fluids into a fluidized bed gasification reactor. Three concentric tubes extend vertically upward into the fluidized bed. Coal particulates in a transport gas are injected through an inner tube, and an oxygen rich mixture of oxygen and steam are injected through an inner annulus about the inner tube. A gaseous medium relatively lean in oxygen content, such as steam, is injected through an annulus surrounding the inner annulus.

10 Claims, 9 Drawing Figures

GASIFICATION SYSTEM

BACKGROUND OF THE INVENTION

The invention disclosed herein was made or conceived in the course of or under a contract with the United States Government, as represented by the United States Department of Energy, the contract being identified as number EF-77-C-01-1514.

FIELD OF THE INVENTION

This invention relates to fluidized bed reactors generating a combustible product gas from carbonaceous materials, and more particularly provides feed configurations and mediums for such reactors.

DESCRIPTION OF THE PRIOR ART

One of the most promising forms of useful energy generation is the production of combustible product gases from coal and other hydrocarbonaceous materials. Among such systems are those utilizing fluidized beds in the gasification process, for example, as disclosed in U.S. Pat. Nos. 3,804,606 and 3,847,563. A feed system for such processes includes an upward injection into a fluidized bed housed in a vertical vessel, having an inner tube through which particulate coal and a transport gas flow, and an annular region surrounding the inner tube through which an oxidizing gas such as air, or a mixture of oxygen and steam flows. The coal, transport gas and oxidizing gas are discharged upwardly into the combustion jet. Additionally, a fluidizing and cooling gas, such as steam, is discharged radially, at a low elevation, below the region of substantial fluidization, to facilitate char-ash separation.

While this system operates satisfactorily, improvements can be made. For example, it has been found that at the upper tip of the injection system, the coal particles tend to sinter, due primarily to high temperatures, and form an ash buildup. The ash pieces can be large, on the order of six inches in length and several inches in width, as compared to other ash particles of a size which would pass through a 40 mesh screen. The large ash buildup subsequently breaks from the injection tubes, particularly with a change in the injection velocity of the oxidizing gas and, due to its relatively large size, tends to complicate ash removal from the bottom of the containing vessel. This concern is particularly severe in the case of oxygen-steam gasification where the combustion zone temperature would approach the ash softening temperature for the coal.

In order to alleviate sintering buildup, large, high velocity steam flows could be utilized, which would tend to dislodge the sintered buildup. However, excessive steam injection detrimentally lowers the ultimate heating value of the product gas and, ash removal complications still arise. Excessive steam injection also poses an economic penalty in terms of system operating and capital costs. To increase the product gas heating value, it is desirable to increase the ratio of oxygen to steam entering the gasifier. However, as the percentage of oxygen increases, the combustion jet tends to burn hotter, leading toward more sintering and the resulting undesirable buildup of large ash particles.

SUMMARY OF THE INVENTION

It is therefore desirable to provide an improved gasification reactor system which allows increased oxygen injection ratios, and corresponding increased heating values in the product gas. It is also desirable to further alleviate the potential for large particle sintered ash buildup, and thus provide greater flexibility in ash removal from the reactor.

This invention provides an improved gasification reactor system, and particularly a feed system, which allows increased oxygen injection ratios and resultant higher heating value product gases. It also alleviates the potential for large particle sintering buildup.

A pressurized fluidized bed and combustion jet are contained within a vertically disposed vessel. A plurality of vertical concentric tubes extend upwardly into the central region of the vessel. Through the innermost tube flows particulate coal in a transport gas. A second tube surrounds the first tube, and is spaced therefrom so as to form a circular inner annulus. The upper ends of these tubes are configured such that the inner annulus preferably expands in an inverted conical configuration, the cone being at an angle of less than 7½° from vertical. The inverted conical portion of the annulus can be formed by tapering the inner wall of the second tube to a near knife-edged tip, and by forming the upper end of the outer wall of the inner tube, or an upper nozzle for the inner tube, in an expanded configuration generally parallel to the taper of the second tube. The inner annulus can also extend vertically its entire length, without a conical expansion.

A third tube surrounds the second tube, and is spaced therefrom so as to form a second annulus. The top of the third tube is at an elevation slightly below that of the innermost and second tubes. The wall of the third tube is also preferably tapered to form a generally pointed upper tip. The second annulus can house plugs, contiguous with the second and third tubes in selected sections of the annulus, which impart a pulsating flow pattern to the gaseous medium flowing therethrough.

Particulate coal in a transport gas, typically recycled product gas, flows upwardly through the innermost tube and into the combustion jet. A mixture of oxygen and steam, which can include up to approximately 80% or more oxygen by volume, flows through the inner annulus and, due to either the inverted conical upper configuration or general dispersion characteristics, upwardly about the jet region so as to generally form a shroud about the inner jet. High velocity steam flows through the second annulus, being discharged in a pulsating fashion due to interaction with the plugs. The steam tends to sweep upwardly against the upper end of the second tube, and then disperse. Another annulus is formed about the third tube, and discharges fluidizing gas at a much lower elevation, for the purpose of enhancing char-ash separation, as used in the prior art.

The near knife-edged tips alleviate surfaces for buildup of the sintered ash, although the inner tube can provide an increased upper surface area where an angled discharge is utilized. Additionally, it has been found that, although increased percentages of oxygen can be fed into the gasifier, which otherwise would tend to increase temperatures at the coal injection area and cause sintering, the disclosed system tends to form a steam jet about the inner combustion jet which is, relative to prior systems, an oxygen deficient boundary. Thus, coal and char particles circulating in the fluidized bed enter the combustion jet not through a low-to-high oxygen content transition, but through an additional intermediate oxygen-lean phase. The initial injection of particles into the jet is at high velocity, such that the particles do not have sufficient residence time to sinter. Sintering, even at high oxygen injections, is thus alleviated, and higher heating value product gas is produced.

BRIEF DESCRIPTION OF THE DRAWINGS

The advantages, nature and additional features of the invention will become more apparent from the following description, taken in connection with the accompanying drawing, in which.

DESCRIPTION OF THE PREFERRED EMBODIMENTS

Figure 1A:
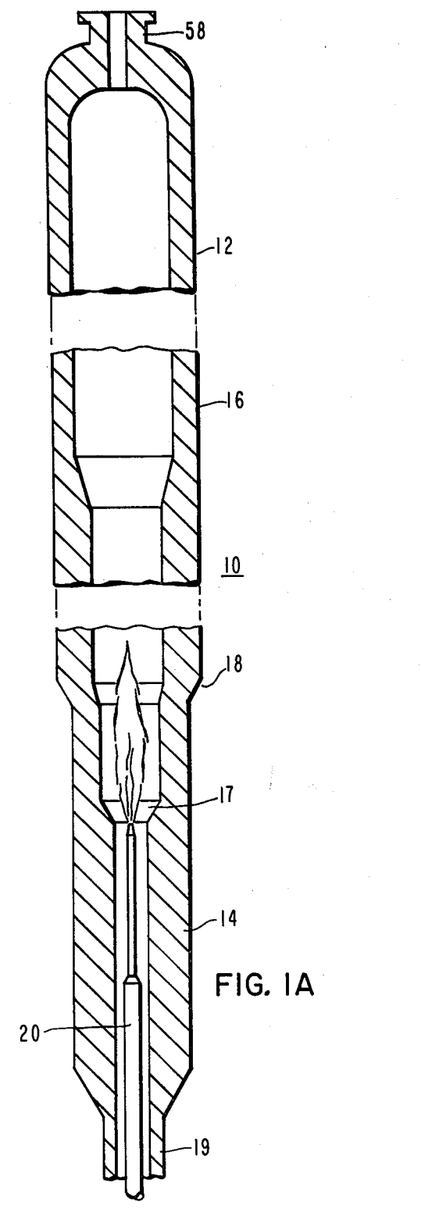
FIG. 1A is a simplified elevation view, in section, of a gasification reactor vessel and injection system in accordance with the invention.
Figure 1B:
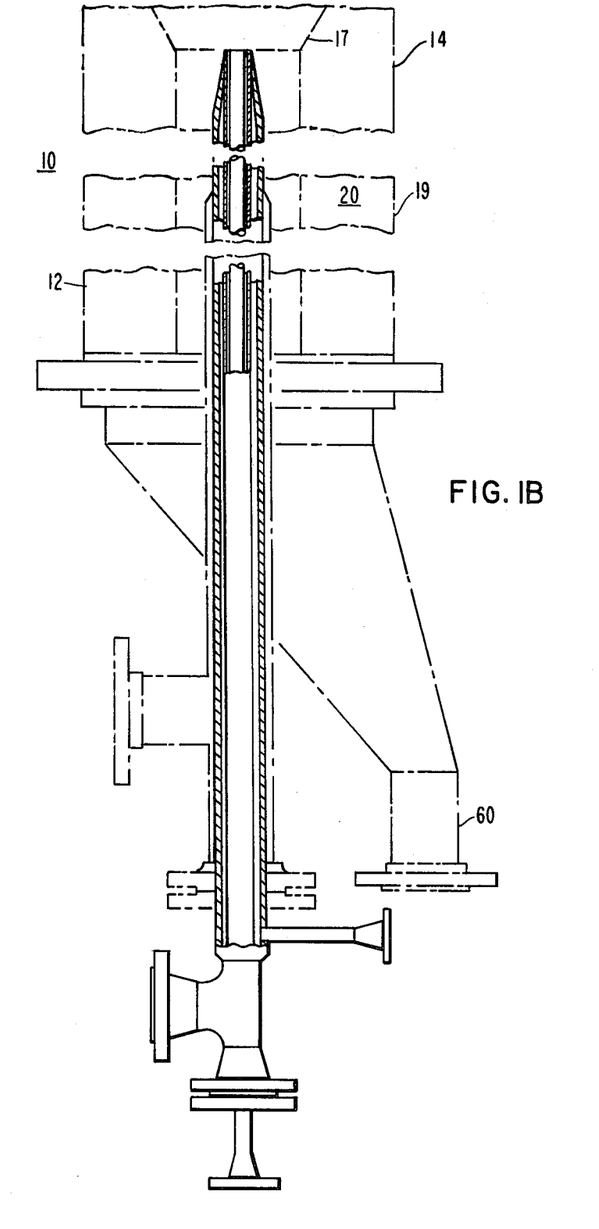
FIG. 1B is an enlarged and more detailed elevation view of the lower components of FIG. 1A.
Figure 2:
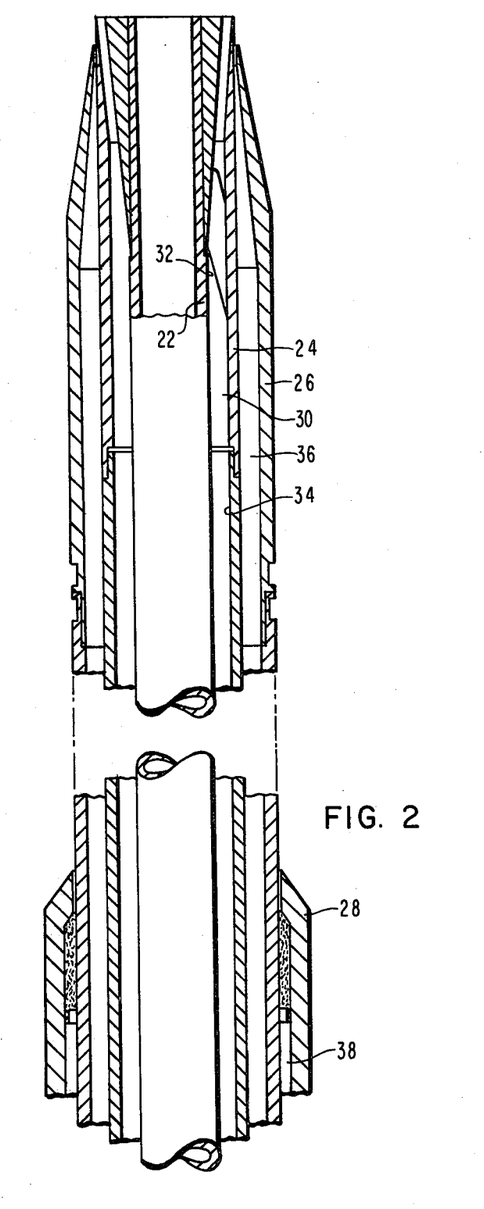
FIG. 2 is an enlarged elevation view, in section, of the upper portion of the injection system of FIG. 1.

Referring now to FIGS. 1A and 1B, there is shown a pressurized fluidized bed reactor 10 for producing a combustible product gas. The fluidized bed is housed within a vessel 12 including a generally cylindrical lower section 14, an enlarged generally cylindrical upper section 16, an inverted conical transition 18, an inverted conical grid section 17, and a cylindrical ash removal section 19. Process mediums are fed into the reactor 10 through an injection system 20, including (FIG. 2) an inner tube 22, a second tube 24, a third tube 26, and, at a lower elevation, an outer tube 28. An inner annulus 30 is formed between the outer surface 32 of the inner tube 22 and the inner surface 34 of the second tube 24. A second annulus 36 is formed between the second 24 and third 26 tubes. A third annulus 38 is formed between the outer tube 28 and the third tube 26. As shown in FIGS. 1A and 1B, the inner 22, second 24 and third 26 tubes terminate near the grid 17 elevation.

Figures 3, 4:
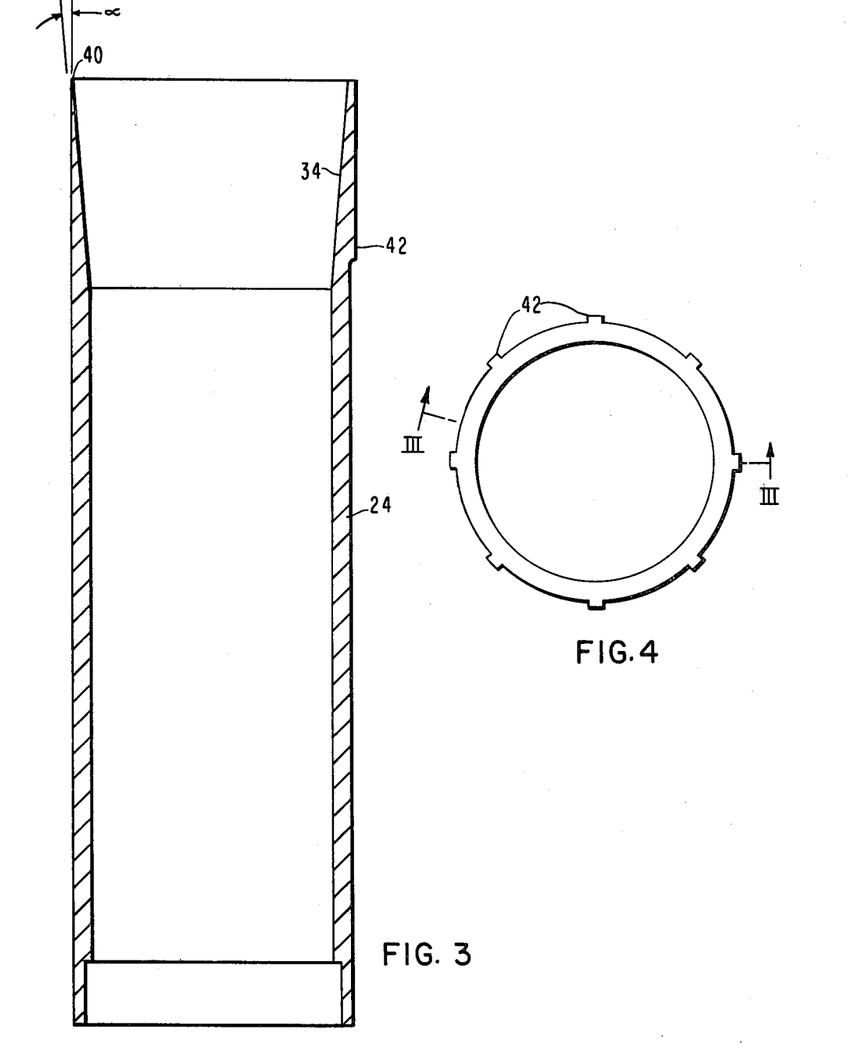
FIGS. 3 and 4 are respectively cross-sectional elevation and top views of a portion of a second tube.
Figure 5:
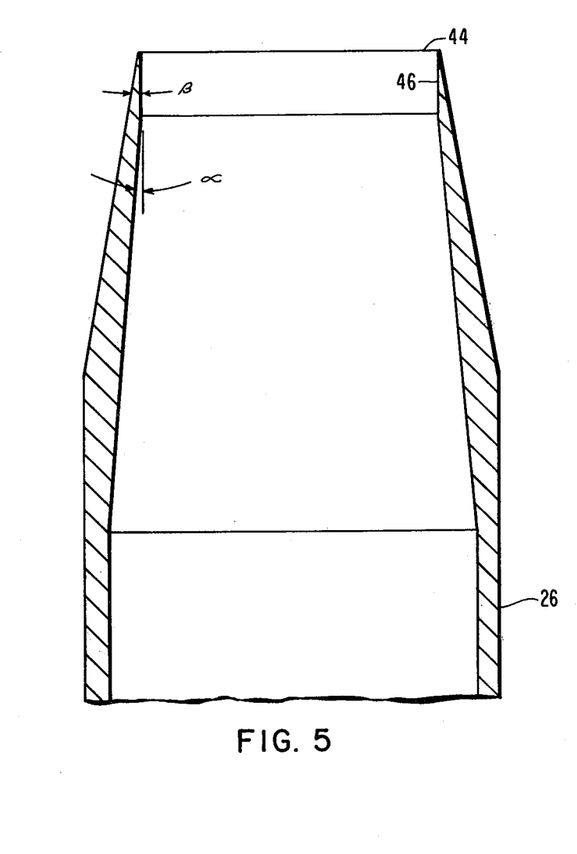
FIG. 5 is a cross-sectional elevation view of a third tube.

The upper segments of the second 24 and third 26 tubes are shown in additional detail in FIGS. 3, 4 and 5. The second tube 24 is tapered at its upper end to form a narrowed upper tip 40. The actual shape of the tip 40 can vary, and can include a rounded surface. The angle α is preferably less than 7½°, and is 5° in the exemplary embodiment. The second tube 24 is also provided with means for pulsing the fluid medium in the second annulus 36, such as plugs 42. Pulsing means of other types can also be provided in the second annulus 36, or in pumping apparatus (not shown) which directs a fluid medium through the second annulus 36. The third tube 26 also includes a pointed or narrowed upper tip 44. In the exemplary embodiment, the angles β and γ are respectively 10° and 5°. A cylindrical aperture 46, approximately ½ inch deep, is provided at the top of the third tube 26. With the second tube 24 positioned within the third tube 26, the annular clearance at the top, plus or minus tolerance, is 0.027 inch. The plugs 42 substantially fill the second annulus 36 at their locations, merely leaving a tolerance of approximately 0.0025 inch. The third tube 26 terminates approximately one-quarter inch below the second tube 24, as discussed more fully with respect to FIG. 9.

Figure 6:
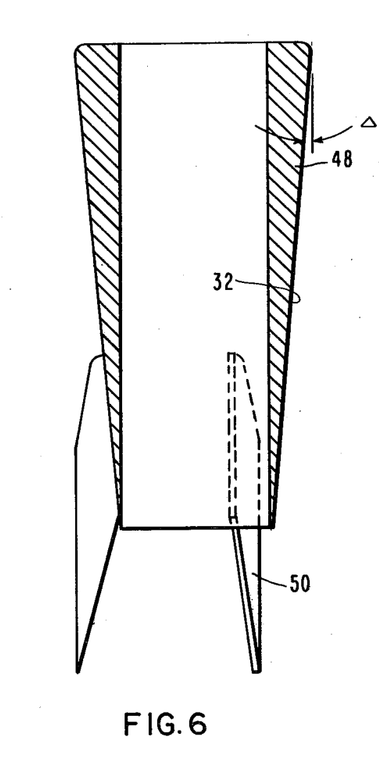
FIG. 6 is a cross-sectional view of an insert for the top of an inner tube.

FIG. 6 presents additional detail of an inner nozzle 48 which is affixed to, and forms the top of, the inner tube 22. The inner nozzle 48 is an inverted, truncated conical annular structure. The angle Δ is 5°. Also shown in FIG. 6 is one of three spacers 50 positioned about the inner nozzle to better distribute flow in the inner annulus 30. With the inner tube 22, including the inner nozzle 48, concentrically positioned within the second tube 24, the outer surface 32 of the inner tube 22 is generally parallel to the inner surface 34 of the upper portion of the second tube 24, both being angled less than 7½°, and preferably being angle at 5°, from vertical. The inner annulus 30 thus extends vertically upward from the bottom of the vessel 12, and angles radially outward and upward at its top. Other configurations can be utilized to achieve an outward and upward injection.

Preferred dimensions for the exemplary embodiment described, which has been successfully utilized in a fifteen ton per day process development gasification unit, are summarized in Table I.

TABLE I

| ITEM | INCHES |
|---|---|
| Inner tube I.D. | 1.00 |
| Inner tube O.D. | 1.275 |
| Inner nozzle upper O.D. | 2.00 |
| Inner nozzle I.D. | 1.280 |
| Second tube O.D. | 2.375 |
| Second tube I.D. | 2.070 |
| Plug circle O.D. | 2.425 |
| Third tube O.D. | 3.50 |
| Third tube I.D. | 3.068 |
| Third tube top I.D. | 2.430 |

Figure 7:
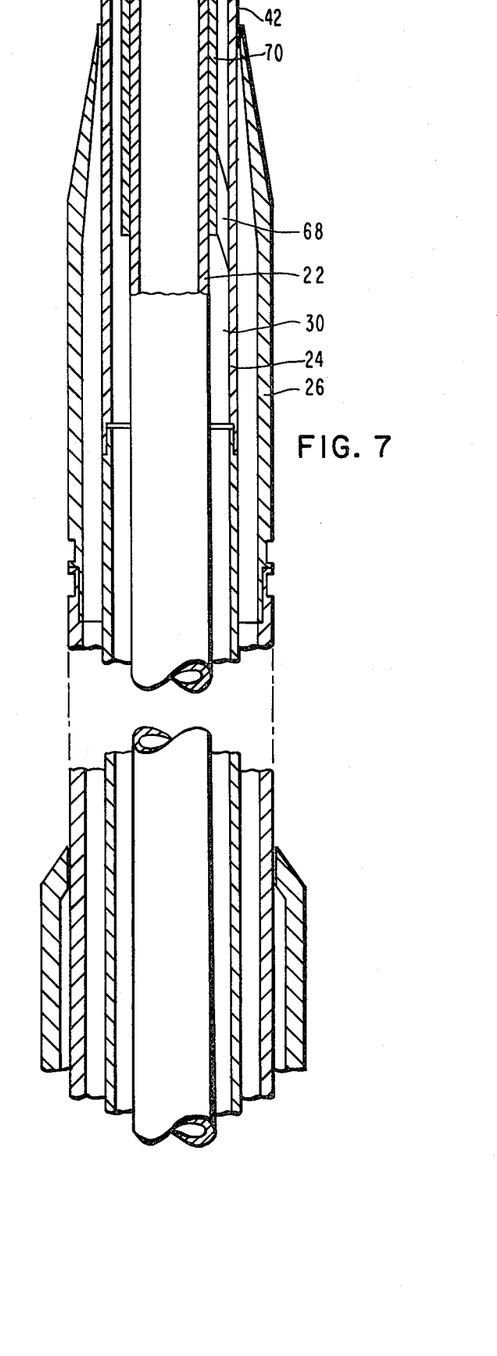
FIG. 7 is a cross-sectional elevation of another embodiment, similar to FIG. 2.

A second embodiment is shown in FIG. 7. It differs from the embodiment of FIG. 2 in that the inner annulus 30 does not terminate in an outwardly angled configuration, but extends vertically its entire length. Accordingly, the inner tube 22 and second tube 24 are tubular throughout their length. Reduced tips can also be utilized. The third tube 26 is preferably tapered, and terminates approximately one-half inch below the inner 22 and second tubes. Eight plugs 42 are spaced about the top of the second tube 24. Also provided is a cylindrical nozzle 70, positioned closely about the inner tube 24. The nozzle 70 is affixed to the second tube 24 by three fins 68. Thus, upon thermal expansion of the various tubes, the inner tube 22 is free to expand and slide axially relative to the nozzle 70. The nozzle does, however, provide lateral positioning and support to maintain a concentric relation among the tubes.

If desired, the inner annulus 30 can be provided with means for arresting a flame which undesirably could form in the annulus.

Figure 8:
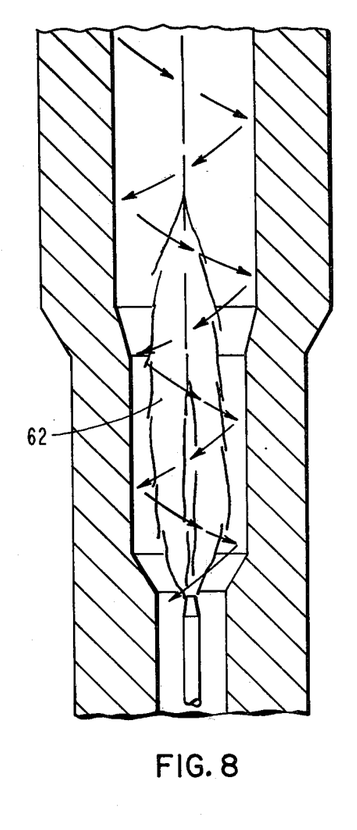
FIG. 8 is a schematic elevational view of a combustion jet, showing typical particle flow paths within a gasification system.

During operation, the reactor processes particulate hydrocarbonaceous material, such as coal, into a combustible product gas, discharged through outlet nozzle 58 (FIG. 1A), and ash, discharged through a bottom fitting 60 (FIG. 1B). In the exemplary system, particulate coal in a transport gas, preferably combustible recycled product gas, flows upwardly through the inner tube 22 and directly into the center of a combustion jet 62 (FIG. 8). A mixture of oxygen and steam flows upwardly through the inner annulus 30, and as a result of the angled discharge, in accordance with the embodiment of FIG. 2, forms an oxygen lean boundary about the inner jet. It is known that in the absence of a directed outward discharge, a free jet will expand outward at an angle of approximately 7½° to vertical. It has now been found that a combustion jet in the fluidized system disclosed, also tends to expand at approximately 7½° to vertical. By controlling the angle of discharge, the diffusion zone among the discharge streams is made wider.

High velocity steam flows upwardly through the second annulus 36 and into the fluidized bed. The steam tends to form a cooling shroud about the inner combustion jet. This steam shroud functions as an oxygen deficient phase about the jet. Thus, coal or char particles circulating in the fluidized bed, which enter the combustion zone from the outer regions, enter the jet only after first passing through the oxygen lean shroud. This shrouding affect is realized in the embodiment of both FIGS. 2 and 7.

The general flow path of a carbonaceous particle is upwardly through the inner tube 22 and rapidly through the central region of the combustion jet. This initial passage through the central region of the jet is rapid enough to prevent any substantial sintering. A particle then resides in the upper and transition portions of the vessel, in the fluidized bed, passing into and through the combustion jet, as depicted in FIG. 8. This process continues until the particle density is such that the fluidization tendency is lessened, and a resulting ash particle eventually flows downward for removal from the vessel.

With the disclosed configurations, two effects thus combine to alleviate previous sintering concerns. First, because the combustion jet is relatively constrained in the local region constrained where coal is injected, it is moving at a higher velocity, so that the coal particles move through quickly and accordingly do not reside for a sufficient period of time in a local high temperature region to achieve a sintering condition. Thus, sintering is alleviated even though increased amounts of oxygen are advantageously utilized which produce a higher heating value product gas. Second, coal and char particles circulating in the fluidized bed from outside, into and through the combustion jet, pass into the jet through an intermediate, lower oxygen content, boundary phase, which tends to achieve gasification in several stages, as opposed to a rapid carbon depletion condition typical of sintering.

Figure 9:
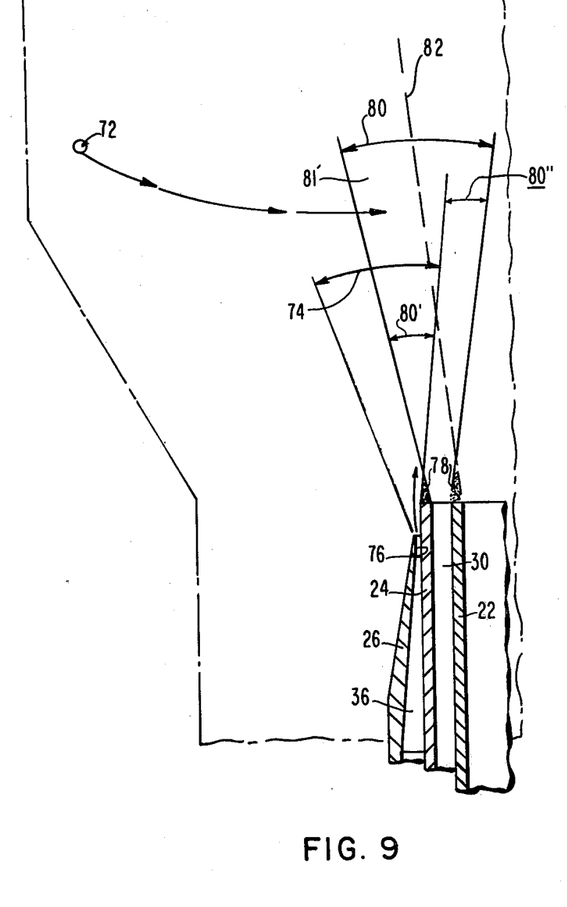
FIG. 9 is a view of the regions a particle flows through in accordance with the invention.

The staged gasification regions are illustrated in FIG. 9. A particle 72, entering the jet from its outer boundary, first flows through an outer region 74 of steam. The steam flows from the second annulus 36, and expands upwardly and outwardly, generally at a 7½° angle. The steam region 74 represents a zone generally lean in oxygen. As shown, because the top of the third tube 26 is spaced slightly below the top of the second tube 24, the inner portion of the steam flow sweeps upwardly against the outer surface 76 of the second tube 24, and then over its top. This sweeping action assists in the alleviation of substantial sintering buildup 78. Thus, the relative size and support configuration for the various tubes should provide for the elevational spacing shown, at normal operating temperatures, taking into account relative thermal expansions.

The particle 72 continues inwardly into an intermediate region 80 which is predominantly defined by the rich oxygen and steam discharge from the inner annulus 30. Whether this discharge is intentionally outwardly angled, or vertical, the region expands and intermixes with the steam in outer region 74, thus forming two general zones 80′ and 80″, with zone 80″ being more rich in oxygen concentration than zone 80′. The heavy dotted line 82 represents the boundary of the coal and transport gas discharged from the inner tube 22 and rapidly passing through the combustion jet.

Thus, the particle 72 passes through a series of regions 74, 80′; 80″ which are progressively more rich in oxygen content. In this manner undesirably rapid carbon depletion is avoided, and sintering is alleviated.

Referring back to FIG. 2, a supplemental cooling and fluidizing gas, such as steam or recycled product gas, flows upwardly in the third annulus 38, and is discharged in a radial and preferably downward direction into the reactor at a lower elevation than the abovediscussed mediums. This medium particularly enhances char to ash separation and ease of ash withdrawal.

The velocity of the coal and transport gas injection should be greater than the choking velocity of the particulates. In the exemplary 15 ton per day unit, tests have been successfully performed conveying from zero to seventy weight percent solids in recycled product gas at local tip velocities between 30 and 70 feet per second. The system allows a high percentage of oxygen concentration in the oxygen-steam mixture, up to 70 to 80 or even greater percent by volume. Utilizing an oxygen-steam mixture, successful operation has been demonstrated in mixtures up to 80% by volume oxygen at velocities of 50 through 160 feet per second while processing various coals such as Pittsburgh Steam, Ohio ∩9, Ind., Wyoming Sub-C, Western Kentucky ∩9 and Texas Lignite. The transport gas temperature is preferably about 500° F. It is expected that successful operation at oxygen concentrations up to 100% is probable. The same coals have been successfully processed utilizing a mixture of air and steam discharged from the inner annulus 30, representing about 21% oxygen by volume, at velocities between 50 and 300 feet per second. Thus, the actual percentage of oxygen can desirably be adjusted between approximately 21% and approximately 100%, dependent upon the product gas heating value desired and the characteristics of the feed particulate material. The supplemental shrouding steam is preferably injected at a high velocity, greater than 100 feet per second, and has been successfully varied up to 150 feet per second. Other gaseous mediums can also be utilized in the second annulus 36, as long as a relatively lean oxygen content, relative to the inner annulus, is maintained. For example, carbon dioxide has successfully been utilized. Carbon dioxide is particularly suitable during startup, when operating temperatures have not been achieved.

The relative velocities of the three injection mediums should be adjusted so that the inner particulate injection is above the choking velocity and sufficiently rapid to avoid sintering in the initial passage of particles through the central portion of the jet. Additionally, the second annulus 36 discharge should be at a velocity less than or equal to the velocity of discharge from the inner annulus 30. This latter relation is preferably maintained in order to allow relatively free expansion of the upper sections of the oxygen-lean regions. Restriction of expansion through excessive steam flow would tend to squeeze the jet inwardly, and lessen the volume of the oxygen lean zones. Additionally, if the velocity of the outer steam injection, relative to the inner annulus oxygen and steam injection, is too low, the jet will tend to disperse too rapidly and result in loss of the multiple region benefit. Under such conditions the reactor system would operate as if no distinct zones were present and, accordingly, sintering would occur. It is therefore preferred that the ratio of second annulus injection velocity to inner annulus velocity be approximately 70% to 85%, and preferably about 80%.

We claim:

1. A method of operating a gasification reactor of the type wherein solid particulate carbonaceous material, oxygen, steam and an oxygen lean medium are fed from an injection means having an upper tip into a vertically disposed vessel housing a combusting fluidized bed to produce a combustible product gas and ash, to prevent substantial sintering of said tip, comprising:

injecting a mixture of said particulate material and a transport gas vertically upward into said fluidized bed at a velocity of between 30 and 70 feet per second;

injecting a mixture of oxygen and steam upwardly into said bed and about the radial periphery of said particulate and gas mixture at a velocity of between 50 and 300 feet per second;

injecting an oxygen lean gaseous medium upwardly into said bed and about the radial periphery of said oxygen and steam mixture at a velocity equal to or less than said oxygen and steam mixture velocity.

2. The method of claim 1 wherein said particulate and transport gas mixture and said oxygen and steam mixture are injected by said injection means into said fluidized bed at approximately the same elevation, and said oxygen lean gaseous medium is injected upwardly into said fluidized bed at a slightly lower elevation such that said oxygen lean medium sweeps upwardly across said tip.

3. The method of claim 2 wherein said oxygen lean gaseous medium is injected at an elevation approximately one-half inch below said particulate and transport gas and said oxygen and steam mixture injections.

4. The method of claim 1 wherein said oxygen and steam mixture is injected upwardly into said bed at an outward angle, said angle being less than 7½° with respect to vertical.

5. The method of claim 1 wherein said oxygen lean gaseous medium is injected into said bed in a pulsating fashion.

6. The method of claim 1 wherein said particulate and transport gas mixture is injected at a velocity greater than the choking velocity of said particulates, said oxygen and steam mixture is injected at a velocity greater than the injection velocity of said particulate and transport mixture, and said oxygen lean gaseous medium is injected at a velocity between approximately 70% and 85% of the injection velocity of said oxygen and steam mixture.

7. The method of claim 6 wherein said particulate and transport gas mixture injection velocity is between approximately 40 and 60 feet per second, said oxygen and steam mixture injection velocity is greater than 70 feet per second, and said oxygen lean gaseous medium injection velocity is greater than 100 feet per second.

8. The method of claim 1 wherein said mixture of oxygen and steam are injected at an oxygen concentration greater than 70% by volume.

9. A method of operating a gasification reactor of the type wherein solid particulate carbonaceous material, oxygen, steam and an oxygen lean medium are fed from an injection means comprising an upper tip, and a number of vertical concentric tubes into a vertically disposed vessel housing a combusting fluidized bed to produce a combustible product gas and ash, to prevent substantial sintering of said tip, comprising:

injecting a mixture of said particulate material and a transport gas vertically upwardly and into said fluidized bed through a first vertical tube extending upwardly into said bed at a velocity of between 30 and 70 feet per second;

injecting a mixture of oxygen and steam vertically upward and into said fluidized bed through an inner annulus formed between said first vertical tube and a second vertical tube which is concentric with and spaced about, said first vertical tube at a velocity of between 50 and 300 feet per second;

injecting an oxygen lean gaseous medium vertically upwardly and into said fluidized bed through a second annulus formed between said second tube and a third vertical tube which is concentric with, and spaced about, said second vertical tube at a velocity equal to or less than said oxygen and steam mixture velocity.

10. The method of claim 9 wherein said injecting of particulate material and a transport gas, and said injecting of a mixture of oxygen and steam by said injection means are at a common elevation, and said injecting of an oxygen lean gaseous medium is at an elevation approximately one-half inch below said common elevation such that said oxygen lean medium sweeps upwardly across said tip.

* * * * *